United States Patent
Okano et al.

(10) Patent No.: US 12,308,702 B2
(45) Date of Patent: May 20, 2025

(54) ROTOR OF ROTATING ELECTRIC MACHINE AND ROTATING ELECTRIC MACHINE

(71) Applicant: MITSUBISHI GENERATOR CO., LTD., Kobe (JP)

(72) Inventors: Saya Okano, Tokyo (JP); Go Kajiwara, Tokyo (JP)

(73) Assignee: MITSUBISHI GENERATOR CO., LTD., Kobe (JP)

( * ) Notice: Subject to any disclaimer, the term of this patent is extended or adjusted under 35 U.S.C. 154(b) by 0 days.

(21) Appl. No.: 18/251,642

(22) PCT Filed: Feb. 1, 2021

(86) PCT No.: PCT/JP2021/003479
§ 371 (c)(1),
(2) Date: May 3, 2023

(87) PCT Pub. No.: WO2022/162930
PCT Pub. Date: Aug. 4, 2022

(65) Prior Publication Data
US 2023/0421005 A1 Dec. 28, 2023

(51) Int. Cl.
*H02K 1/26* (2006.01)
*H02K 1/22* (2006.01)
*H02K 37/00* (2006.01)

(52) U.S. Cl.
CPC ................................. *H02K 1/26* (2013.01)

(58) Field of Classification Search
CPC ............. H02K 1/26; H02K 1/22; H02K 37/00

USPC .................................................. 310/216.001
See application file for complete search history.

(56) References Cited

FOREIGN PATENT DOCUMENTS

| JP | S50141709 U | 11/1975 |
| JP | S5248604 U | 4/1977 |
| JP | 54136603 A | * 10/1979 |
| JP | 2002186267 A | * 6/2002 |
| JP | 2005160141 A | * 6/2005 |
| JP | 2005328614 A | 11/2005 |

OTHER PUBLICATIONS

International Search Report (PCT/ISA/210) with translation and Written Opinion (PCT/ISA/237) mailed on Apr. 20, 2021, by the Japanese Patent Office as the International Searching Authority for International Application No. PCT/JP2021/003479. (8 pages).

* cited by examiner

*Primary Examiner* — Jose A Gonzalez Quinones
(74) *Attorney, Agent, or Firm* — BUCHANAN, INGERSOLL & ROONEY PC

(57) ABSTRACT

A bipolar rotor of a rotating electric machine is such that flexural rigidity asymmetry of a rotor main portion is adjusted using a cross slot provided in a rotor core, and flexural rigidity asymmetry of a rotor stepped portion is adjusted using a cutout groove provided in the rotor stepped portion, whereby optimization is achieved by combining the flexural rigidity asymmetry of the rotor main portion and the flexural rigidity asymmetry of the rotor stepped portion, and vibration in each double frequency vibration flexural vibration mode is restricted over a whole region of driving rotational speed.

26 Claims, 14 Drawing Sheets

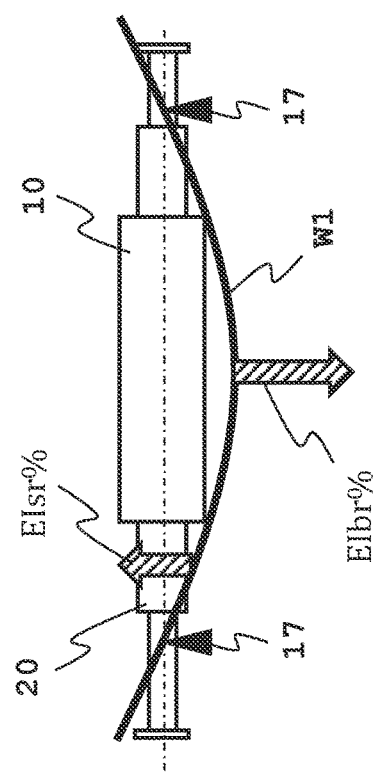
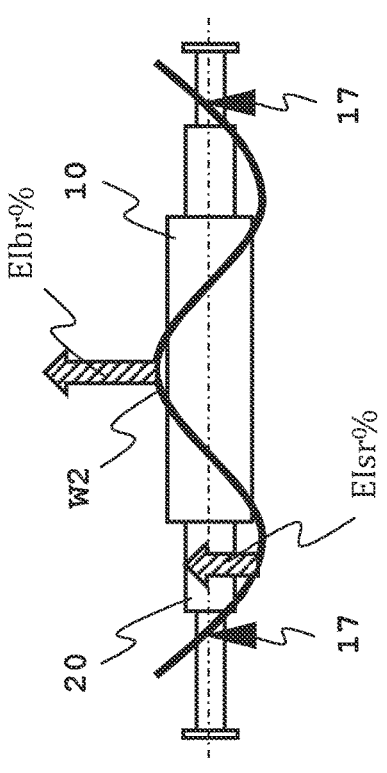

ROTOR OF ROTATING ELECTRIC MACHINE AND ROTATING ELECTRIC MACHINE

TECHNICAL FIELD

The present application relates to the field of a rotor of a rotating electric machine and a rotating electric machine.

BACKGROUND ART

A bipolar rotor of a rotating electric machine, such as a turbine generator, is such that a multiple of rotor slots are provided in a circumferential direction, centered on an axis of rotation, in a rotor core, and a rotor coil is housed in the rotor slots. Also, a rotor wedge for suppressing the rotor coil is inserted into an outer diameter side of the rotor slots.

Rotor slots of a bipolar rotor are disposed concentrated on an interpolar axis side, rather than being disposed evenly with respect to the 360 degrees of the rotor core circumferential direction. That is, this means that the rotor core is such that flexural rigidity around the interpolar axis and flexural rigidity around an in-polar axis are asymmetrical. Because of this asymmetry, a change in gravitational sag having a frequency that is double a rotational speed (double frequency vibration) occurs.

This means that in order to restrict this double frequency vibration, it is necessary to reduce the asymmetry in the flexural rigidities around the interpolar axis and the in-polar axis, and a cross slot in an in-polar axis direction of the rotor core performs this role. A multiple of cross slots are provided in an axis of rotation direction, and the asymmetry of the rotor core flexural rigidities is adjusted by adjusting an axis of rotation direction pitch of the cross slots or depths of cross slot notches.

Herein, the rotor coil inside the rotor slot is held by the rotor wedge, but when the rotor rotates, a centrifugal force acts on the rotor coil and the rotor wedge, because of which the rotor coil and the rotor wedge are restrained, particularly in the interpolar axis direction, contributing to a rise in the flexural rigidity around the in-polar axis. That is, when the flexural rigidity around the in-polar axis with respect to the flexural rigidity around the interpolar axis of a rotor main portion, including the rotor core, the rotor coil, the rotor wedge, and the cross slot, is defined as a flexural rigidity asymmetry ratio of the rotor main portion, the flexural rigidity around the in-polar axis rises together with a rise in rotational speed while driving, because of which the flexural rigidity asymmetry ratio of the rotor main portion also rises. Consequently, it is necessary to determine the axis of rotation direction pitch of the cross slots and the depths of the cross slot notches with consideration to asymmetry ratio dependency on rotational speed.

Herein, a rated rotational speed of a bipolar rotor of a rotating electric machine, such as a turbine generator, is commonly 3,000 rpm or 3,600 rpm, and dangerous speeds of flexural vibration modes of a multiple of double frequency vibrations are passed through until reaching the rated rotational speed from a stopped state. Among these, it is necessary in particular to restrict vibration in a primary flexural vibration mode of a double frequency vibration, wherein vibration is high, and a tertiary flexural vibration mode of a double frequency vibration, wherein a dangerous speed exists in a vicinity of the rated rotational speed. As flexural vibration mode forms, there is a vibration mode having one antinode between two bearings in a primary flexural vibration mode, and a vibration mode having three antinodes between two bearings in a tertiary flexural vibration mode. A rotor main portion corresponds to a position of a vibration mode antinode in any flexural vibration mode. That is, this means that the flexural rigidity asymmetry of a rotor main portion acts as a source of double frequency vibration.

A secondary flexural vibration mode having two antinodes between two bearings also exists, but as this flexural vibration mode is such that a rotor main portion corresponds to a position of a vibration mode node, the flexural rigidity asymmetry of the rotor main portion hardly acts at all as a source of double frequency vibration.

Consequently, it is particularly necessary to restrict vibration in each of a primary flexural vibration mode and a tertiary flexural vibration mode of double frequency vibration, while giving consideration to the rotor main portion flexural rigidity asymmetry ratio dependency on rotational speed. In response to this kind of problem, therefore, a method such that, in order to reduce an excitation force acting on a portion that forms an antinode in each flexural vibration mode, a multiple of sections are provided in an axis of rotation direction with respect to the rotor core, and the axis of rotation direction pitch of the cross slots in each section, or the depths of the cross slot notches, is adjusted, has been disclosed (for example, Patent Literature 1).

CITATION LIST

Patent Literature

Patent Literature 1: JP2005-160141A

SUMMARY OF INVENTION

Technical Problem

However, a rotor of a rotating electric machine, such as a turbine generator, is such that in addition to the rotor main portion, a rotor stepped portion exists on a side of an excitation device having flexural rigidity asymmetry. There are cases wherein double frequency vibration cannot be sufficiently restricted over a whole region of driving rotational speed simply by optimizing rotor main portion flexural rigidity asymmetry.

The rotor core of a rotating electric machine, such as a turbine generator, performs a role of an electromagnet, and the rotor coil is connected to an external power supply. Specifically, the rotor coil wound around the rotor core neighbors the rotor core in the axis of rotation direction, and is connected to an excitation device via an excitation device side rotor stepped portion whose external diameter is smaller than that of the rotor core.

The rotor coil, after passing through a rotor coil lead groove provided in the axis of rotation direction in a position on an in-polar axis direction outer diameter of the excitation device side rotor stepped portion, and passing through a radial lead groove provided from the rotor coil lead groove toward an inner diameter side of the excitation device side rotor stepped portion and parallel to the in-polar axis, passes through an axial lead groove provided following a central axis of the excitation device side rotor stepped portion. As both the rotor coil lead groove and the radial lead groove cause flexural rigidity around an interpolar axis of the excitation device side rotor stepped portion to decrease, the excitation device side rotor stepped portion also has flexural rigidity asymmetry, in the same way as the rotor main portion. Also, as the excitation device side rotor stepped portion exists in a position of a vibration mode antinode in the primary flexural vibration mode and the tertiary flexural vibration mode, the flexural rigidity asymmetry of the excitation device side rotor stepped portion also acts as a source of double frequency vibration. Also, with regard to the secondary flexural vibration mode in which, as previously mentioned, the rotor main portion flexural rigidity asymmetry does not act as a source of vibration, the excitation device side rotor stepped portion exists in a position of a vibration mode antinode, meaning that the flexural rigidity asymmetry of the excitation device side rotor stepped portion acts as a source of double frequency vibration.

Patent Literature 1 achieves an optimization of rotor main portion flexural rigidity asymmetry, but is insufficient in restricting double frequency vibration caused by rotor stepped portion flexural rigidity asymmetry.

The present application has been made to solve the above problem, and an object of the present application is to provide a rotor of a rotating electric machine that is also effective with regard to restricting double frequency vibration caused by rotor stepped portion flexural rigidity asymmetry.

Solution to Problem

A rotor of a rotating electric machine disclosed in the present application includes at least one cutout groove provided in a rotor stepped portion, in an axis of rotation direction of the rotor stepped portion, in such a way that a flexural rigidity around an in-polar axis is adjusted, and a flexural rigidity around an interpolar axis and the flexural rigidity around the in-polar axis have asymmetry.

Advantageous Effects of Invention

According to a rotor of a rotating electric machine disclosed in the present application, flexural rigidity asymmetry of a rotor main portion is adjusted using a cross slot provided in a rotor core, and flexural rigidity asymmetry of a rotor stepped portion is adjusted using a cutout groove provided in the rotor stepped portion, whereby optimization can be achieved by combining the flexural rigidity asymmetry of the rotor main portion and the flexural rigidity asymmetry of the rotor stepped portion, because of which an excitation force existing in a position of a vibration mode antinode in each flexural vibration mode of double frequency vibration can be reduced, meaning that there is an advantage in that vibration in each double frequency vibration flexural vibration mode can be restricted over a whole region of driving rotational speed.

BRIEF DESCRIPTION OF DRAWINGS

FIGS. 8A to 8D are drawings showing excitation forces caused by flexural rigidity asymmetry of the bipolar rotor.

DESCRIPTION OF EMBODIMENTS

First Embodiment

Figure 1:
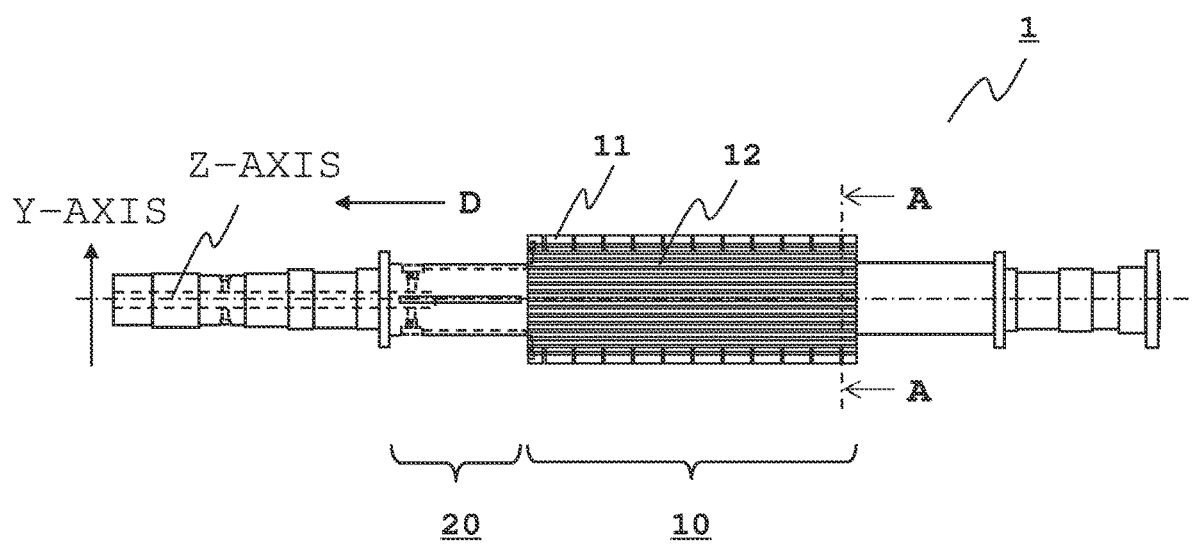
FIG. 1 is an external side view showing a configuration of a bipolar rotor of a rotating electric machine according to a first embodiment.

FIG. 1 is an external side view showing a configuration of a bipolar rotor of a rotating electric machine according to a first embodiment.

Figure 2:
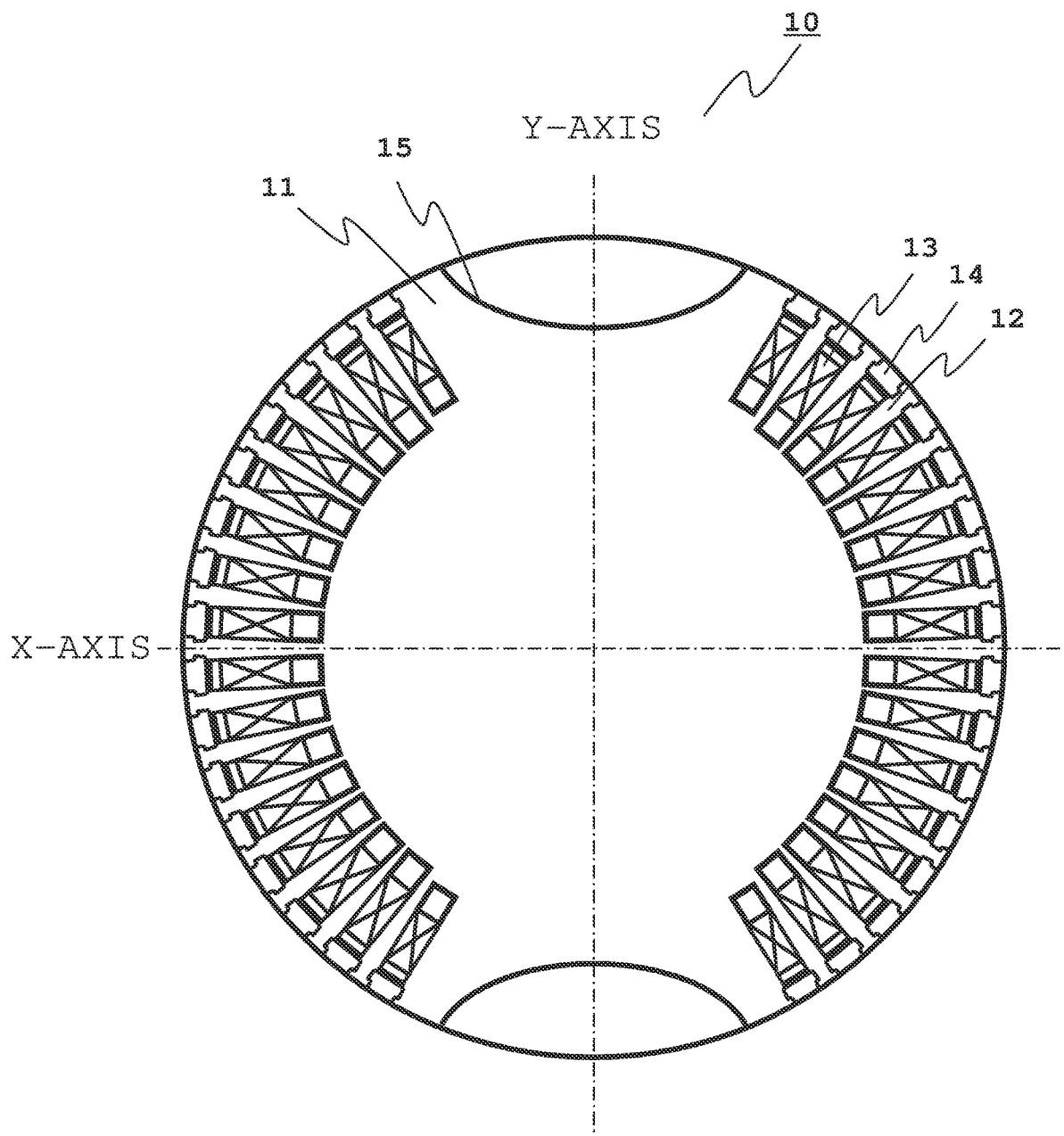
FIG. 2 is a sectional view showing a configuration of a rotor main portion wherein an A-A portion of FIG. 1 is seen from an arrow direction.
Figure 3:
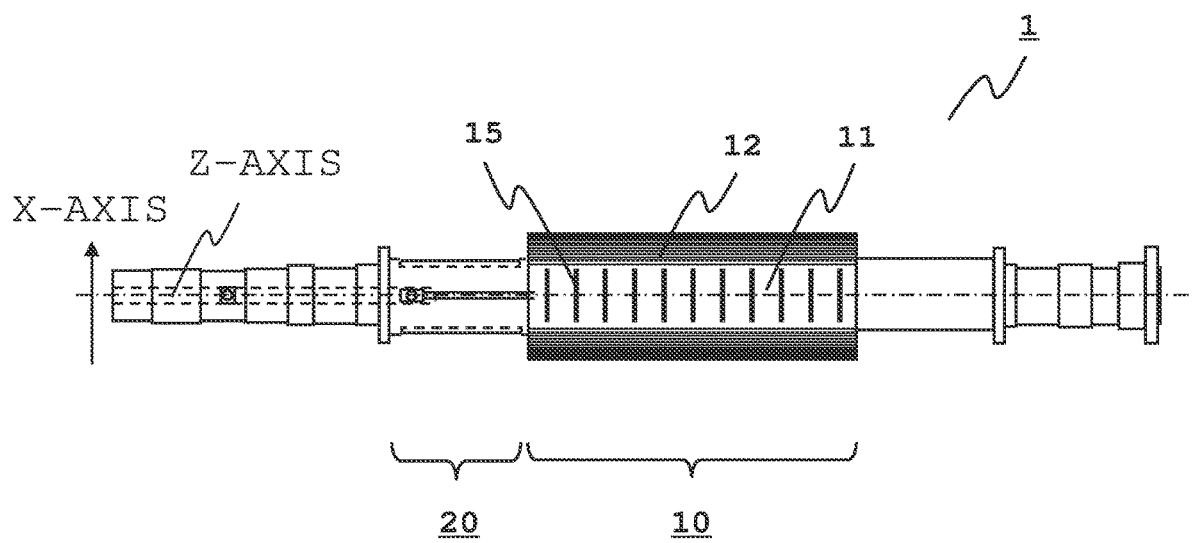
FIG. 3 is an external plan view wherein the bipolar rotor of FIG. 1 is seen from a Y-axis direction.
Figure 4A:
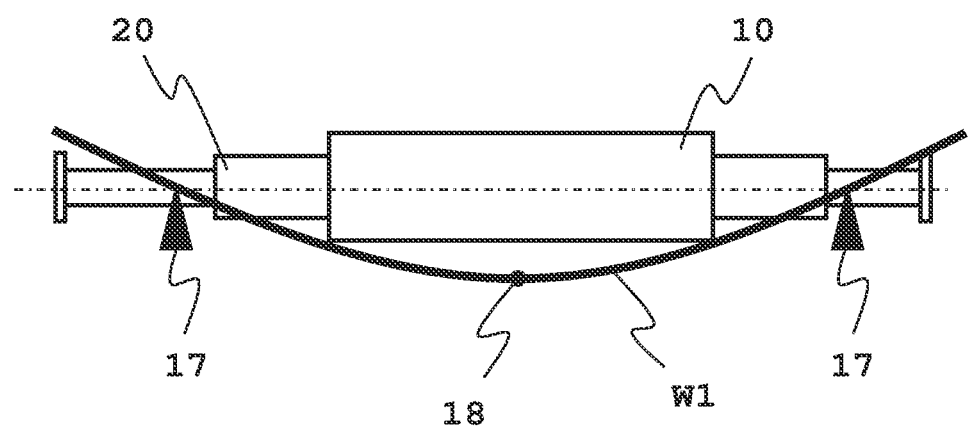
FIGS. 4A and 4B are drawings showing waveforms of a primary flexural vibration mode and a tertiary flexural vibration mode of the bipolar rotor.
Figure 4B:
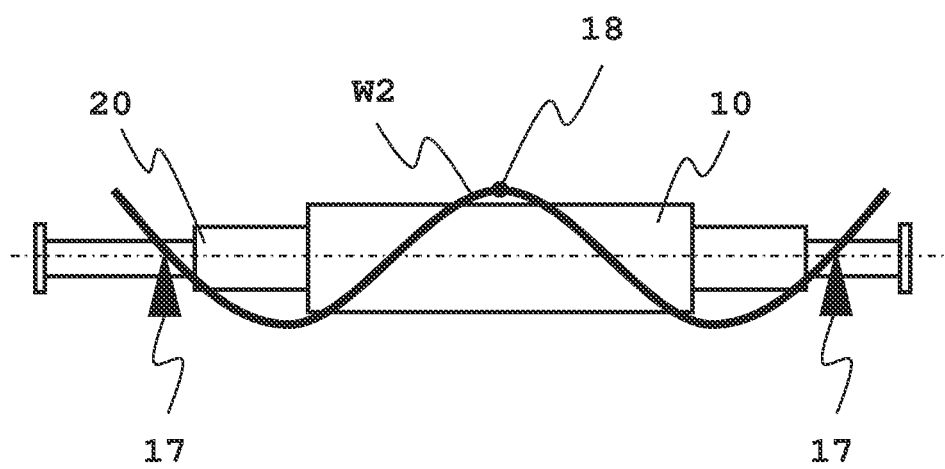
Figure 5:
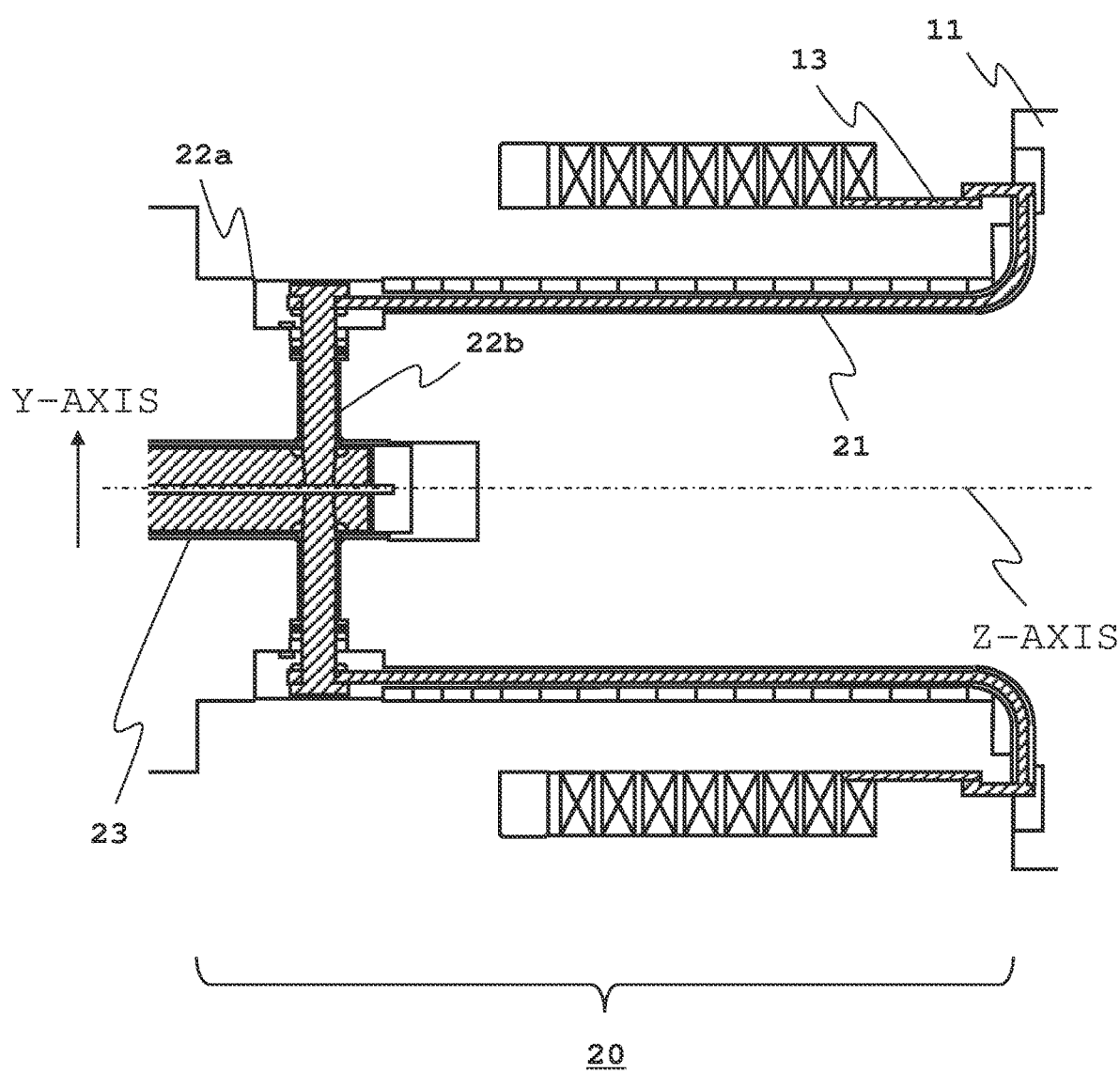
FIG. 5 is a front sectional view showing a connection of a rotor coil of a rotor stepped portion in FIG. 1.
Figure 6:
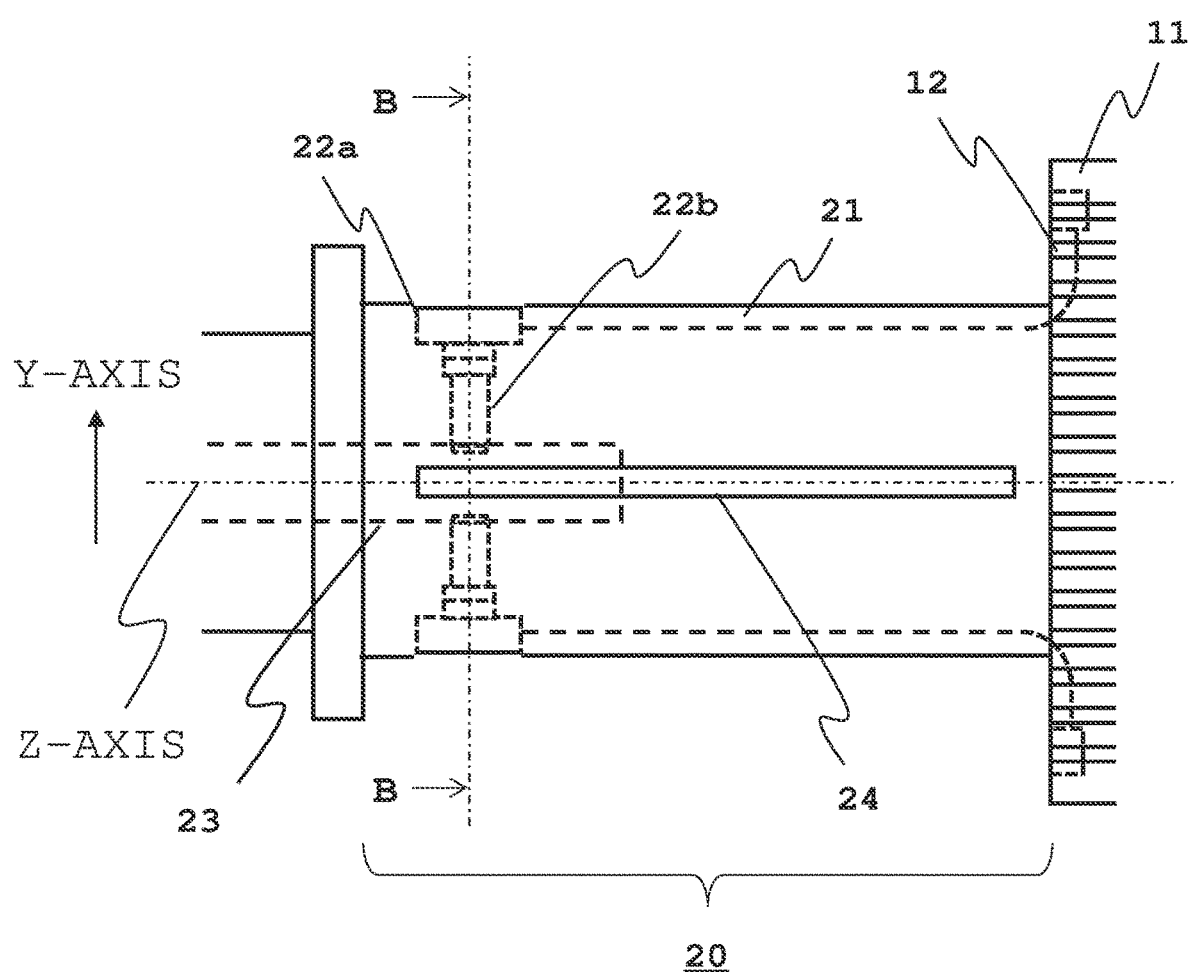
FIG. 6 is a front perspective view showing a first working example of the rotor stepped portion of the first embodiment.
Figure 7:
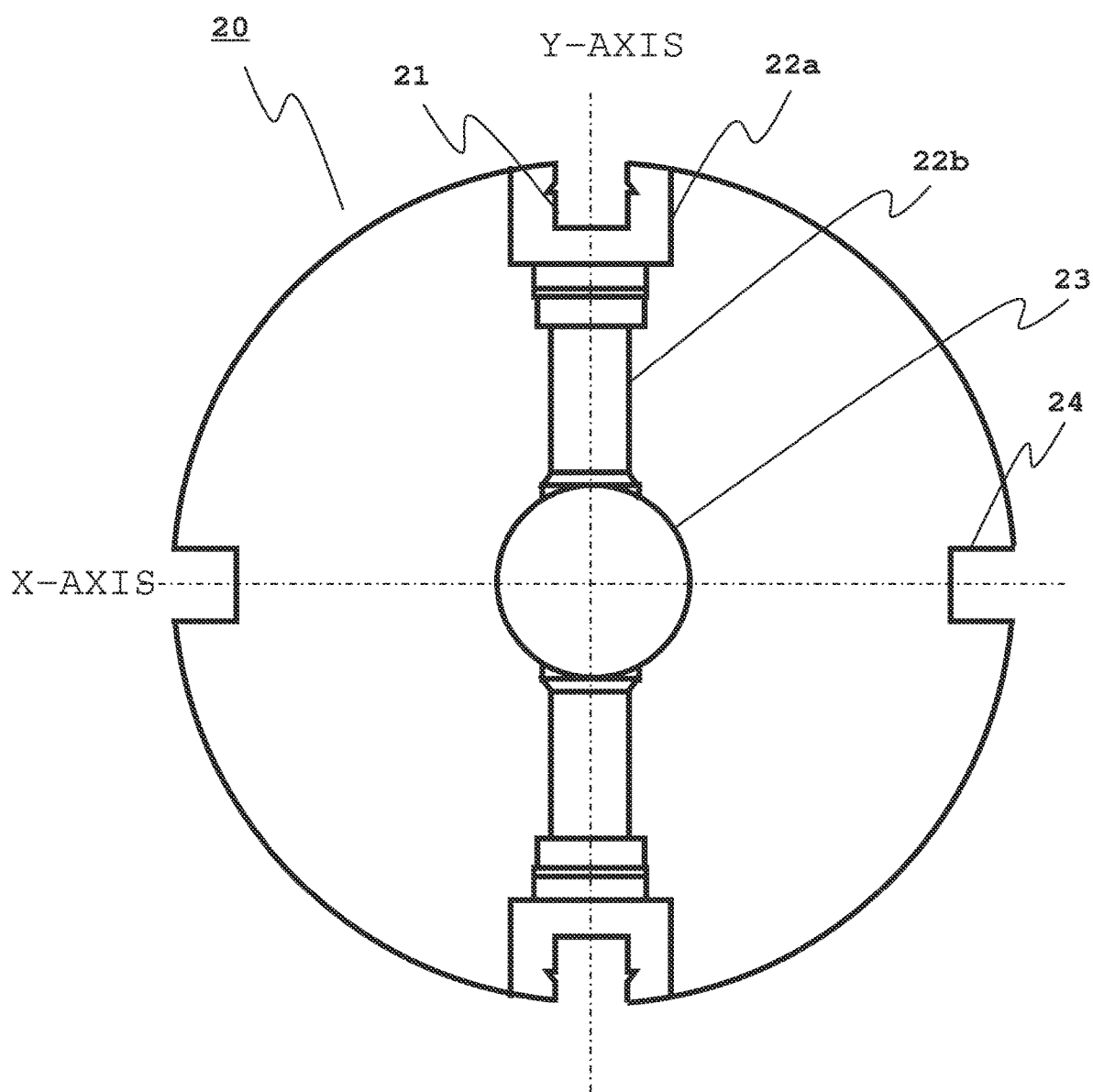
FIG. 7 shows a sectional view of a B-B portion of FIG. 6.

FIG. 2 is a sectional view showing a configuration of a rotor main portion wherein an A-A portion of FIG. 1 is seen from an arrow direction. FIG. 3 is an external plan view wherein the bipolar rotor of FIG. 1 is seen from a Y-axis direction. FIG. 4 is a drawing showing waveforms of a primary flexural vibration mode and a tertiary flexural vibration mode of the bipolar rotor. FIG. 5 is a front sectional view showing a connection of a rotor coil of a rotor stepped portion in FIG. 1. FIG. 6 is a front perspective view showing a first working example of the rotor stepped portion of the first embodiment. FIG. 7 shows a sectional view of a B-B portion of FIG. 6. Also, FIG. 8 is a drawing showing excitation forces caused by flexural rigidity asymmetry of the bipolar rotor.

Using FIG. 1, a configuration of a bipolar rotor 1 of a rotating electric machine according to the first embodiment will be described. The bipolar rotor 1 shown in FIG. 1 has a rotor main portion 10, and a rotor stepped portion 20 provided on an excitation device side (a D direction in the drawing). Next, as shown in FIG. 2 and FIG. 3, the rotor main portion 10 is configured of a rotor coil 13 wound around a rotor core 11, a multiple of rotor slots 12, which are provided in the rotor core 11 in a circumferential direction with respect to an axis of rotation (a Z-axis) thereof and which house the rotor coil 13, a rotor wedge 14 that is inserted in an outer diameter side of the rotor slot 12 in order to suppress the rotor coil 13, and a multiple of cross slots 15, which are provided in the rotor core 11 at predetermined intervals (a predetermined pitch) with respect to a direction of rotation and an axis of rotation direction of the bipolar rotor 1.

Next, an operation of the bipolar rotor 1 of the first embodiment will be described.

Flexural rigidity asymmetry of the rotor core 11 is adjusted by adjusting Z-axis direction intervals of the cross slots 15, as shown in FIG. 3, or by adjusting depths of notches of the cross slots 15, as shown in FIG. 2. Herein, an axis in a direction in which rotor coils 13 of the rotor core 11 are opposed in FIG. 2 is defined as an interpolar axis (hereafter called an X-axis), and an axis perpendicular to this is defined as an in-polar axis (hereafter called a Y-axis).

As shown in FIG. 2, the rotor coil 13 inside the rotor slot 12 is held by the rotor wedge 14, but as a centrifugal force acts on the rotor coil 13 and the rotor wedge 14 when the bipolar rotor 1 rotates, the rotor coil 13 and the rotor wedge 14 are restrained, particularly in the interpolar axis direction, contributing to a rise in flexural rigidity around the in-polar axis. That is, when flexural rigidity around the X-axis of the rotor main portion 10, including the rotor core 11, the rotor coil 13, the rotor wedge 14, and the cross slot 15, is defined as EIbrX, flexural rigidity around the Y-axis is defined as EIbrY, and a flexural rigidity asymmetry ratio of the rotor main portion 10 is defined as EIbr % (EIbr=(EIbrY/EIbrX−1)×100), the flexural rigidity EIbrY around the Y-axis rises in accompaniment to a rise in a rotational speed of the bipolar rotor 1 while driving, because of which the flexural rigidity asymmetry ratio EIbr % of the rotor main portion 10 also rises. Consequently, it is necessary to determine the Z-axis direction intervals between the cross slots 15, or the depths of the notches of the cross slots 15, with consideration to asymmetry ratio dependency on rotational speed.

E is a suffix representing a Young's modulus, I a suffix representing an area moment of inertia, b a suffix representing the rotor main portion 10, and r a suffix representing a ratio.

Herein, a rated rotational speed of the bipolar rotor 1 of a rotating electric machine, such as a turbine generator, is commonly 3,000 rpm or 3,600 rpm, and dangerous speeds of flexural vibration modes of a multiple of double frequency vibrations are passed through until reaching the rated rotational speed from a stopped state. Waveforms of a primary flexural vibration mode and a tertiary flexural vibration mode of a bipolar rotor are shown in FIG. 4. In either of a primary flexural vibration mode W1 (FIG. 4(a)) and a tertiary flexural vibration mode W2 (FIG. 4(b)), the rotor main portion 10 corresponds to a position of a vibration mode antinode 18 with respect to a bearing 17. That is, this means that the flexural rigidity asymmetry of the rotor main portion 10 acts as a source of double frequency vibration. As a secondary flexural vibration mode is such that the rotor main portion 10 corresponds to a position of a vibration mode node, the flexural rigidity asymmetry of the rotor main portion 10 hardly acts at all as a source of double frequency vibration.

Consequently, it is particularly necessary to restrict vibration in each of the primary flexural vibration mode W1 and the tertiary flexural vibration mode W2, while giving consideration to the rotor main portion 10 flexural rigidity asymmetry ratio EIbr % dependency on rotational speed.

However, the bipolar rotor 1 of a rotating electric machine, such as a turbine generator, is such that in addition to the rotor main portion 10, the rotor stepped portion 20, which has flexural rigidity asymmetry, exists, because of which there are cases wherein double frequency vibration over a whole region of driving rotational speed cannot be sufficiently restricted simply by optimizing the flexural rigidity asymmetry of the rotor main portion 10.

FIG. 5 shows a side sectional view of the rotor stepped portion 20. The rotor coil 13, after passing through a rotor coil lead groove 21 provided in the axis of rotation (Z-axis) direction in a position on a Y-axis direction outer diameter of the rotor stepped portion 20, and passing through radial lead grooves 22a and 22b provided from the rotor coil lead groove 21 toward an inner diameter side of the rotor stepped portion 20 and parallel to the Y axis direction, passes through an axial lead groove 23 provided following the axis of rotation (Z-axis) of the rotor stepped portion 20. In FIG. 5, in order to clarify a connection relationship with the rotor coil 13, a rotor coil lead portion is shown distorted, which differs from reality. As all of the rotor coil lead groove 21 and the radial lead grooves 22a and 22b cause flexural rigidity around the X-axis of the rotor stepped portion 20 to decrease, the rotor stepped portion 20 also has flexural rigidity asymmetry, in the same way as the rotor main portion 10. Also, as shown in FIG. 4, the rotor stepped portion 20 exists in the position of the vibration mode antinode 18 in the primary flexural vibration mode W1 and the tertiary flexural vibration mode W2, because of which the flexural rigidity asymmetry of the rotor stepped portion 20 also acts as a source of double frequency vibration. Also, with regard to the secondary flexural vibration mode (not shown) in which, as previously mentioned, the rotor main portion 10 flexural rigidity asymmetry does not act as a source of vibration, the rotor stepped portion 20 exists in a position of a vibration mode antinode, meaning that the flexural rigidity asymmetry of the rotor stepped portion 20 acts as a source of double frequency vibration.

FIG. 6 is a front perspective view showing a first working example of a rotor stepped portion in the first embodiment. Also, FIG. 7 shows a sectional view of a B-B portion of FIG. 6. As is clear from FIG. 6 and FIG. 7, one set of cutout grooves 24 of the same sectional form are provided over approximately a whole length of the rotor stepped portion 20 with respect to the Z-axis direction in outer diameter positions on the X-axis of the rotor stepped portion 20. As previously mentioned, the rotor coil lead groove 21 and the radial lead grooves 22a and 22b are provided in the rotor stepped portion 20, because of which the flexural rigidity around the X-axis of the rotor stepped portion 20 decreases. That is, when flexural rigidity around the X-axis of the rotor stepped portion 20 is defined as EIsrX, flexural rigidity around the Y-axis is defined as EIsrY, and a flexural rigidity asymmetry ratio of the rotor stepped portion 20 is defined as EIsr % (EIsr=(EIsrY/EIsrX−1)×100), EIsrX is smaller than EIsrY, because of which the asymmetry ratio EIsr % does not become 0%. That is, this means that the rotor stepped portion 20 has asymmetry with respect to the flexural rigidity around the X-axis and the Y-axis.

E is a suffix representing a Young's modulus, I a suffix representing an area moment of inertia, s a suffix representing the rotor stepped portion 20, and r a suffix representing a ratio.

Herein, an optimal combination of the flexural rigidity asymmetry ratio EIbr % of the rotor main portion 10 and the flexural rigidity asymmetry ratio EIsr % of the rotor stepped portion 20 for restricting the double frequency vibration primary flexural vibration mode W1 and tertiary flexural vibration mode W2 will be described, using FIG. 8.

FIGS. 8A to 8D show an excitation force of the double frequency vibration primary flexural vibration mode W1 (FIGS. 8A and 8B) and an excitation force of the tertiary flexural vibration mode W2 (FIGS. 8C and 8D), caused by the asymmetry ratio EIbr % of the rotor main portion 10 and the asymmetry ratio EIsr % of the rotor stepped portion 20. As previously mentioned, the rotor stepped portion 20 is such that the flexural rigidity around the X-axis decreases due to the rotor coil lead groove 21 and the radial lead grooves 22a and 22b, because of which EIsr %>0%. Also, unlike the rotor main portion 10, the rotor stepped portion 20 is such that the excitation force does not change over the whole region of driving rotational speed, because of which the asymmetry ratio EIsr % when there is resonance in the primary flexural vibration mode W1 and the tertiary flexural vibration mode W2 does not change over the whole region of driving rotational speed. In order to restrict a double frequency vibration due to an excitation force caused by the asymmetry ratio EIsr %, it is sufficient that the flexural rigidity asymmetry ratio EIbr % of the rotor main portion 10 is adjusted in such a way that EIbr %<0% when there is resonance in the primary flexural vibration mode W1, and EIbr %>0% when there is resonance in the tertiary flexural vibration mode W2.

As previously mentioned, when the rotational speed of the bipolar rotor 1 rises, the flexural rigidity EIbrY around the Y-axis of the rotor main portion 10 rises due to centrifugal force. That is, as the asymmetry ratio EIbr % also rises in accompaniment to a rise in the rotational speed of the bipolar rotor 1, the cross slots 15 can be adjusted in such a way that EIbr %<0% when there is resonance in the primary flexural vibration mode W1, and EIbr %>0% when there is resonance in the tertiary flexural vibration mode W2.

In order to restrict vibration in the double frequency vibration primary flexural vibration mode W1 or tertiary flexural vibration mode W2, it is sufficient to arrange in such a way that EIbr %<0% and EIsr %>0% when there is resonance in the primary flexural vibration mode W1, and EIbr %>0% and EIsr %>0% when there is resonance in the tertiary flexural vibration mode W2, but optimal application ranges exist for the asymmetry ratios EIbr % and EIsr %. The optimal range when there is resonance in the double frequency vibration primary flexural vibration mode W1 is shown in Expression 1, and the optimal range when there is resonance in the tertiary flexural vibration mode W2 is shown in Expression 2. Also, with regard to the double frequency vibration secondary flexural vibration mode, double frequency vibration can be sufficiently restricted by applying Expression 2.

[Expression 1]

$$-6\% \ EIbr \ \% \leq -1\%, 1\% \leq EIsr \ \% \leq 6\% \quad (1)$$

[Expression 2]

$$1\% \leq EIbr \ \% \leq 6\%, 1\% \leq EIsr \ \% \leq 6\% \quad (2)$$

In order to fulfill this condition, it is often the case that owing to an adjustment of the asymmetry ratio EIsr % in accordance with the first working example shown in FIG. 6, the flexural rigidity EIsrX around the X-axis decreases due to the rotor coil lead groove 21 and the radial lead grooves 22a and 22b provided in the rotor stepped portion 20, as a result of which EIsr %>6%. Consequently, in order to fulfill Expression 1 and Expression 2, it is necessary to provide the cutout groove 24 for causing the flexural rigidity EIsrY around the Y-axis to decrease in the rotor stepped portion 20. The cutout groove 24 is a groove provided in an outer diameter position on the X-axis of the rotor stepped portion 20, and refers to a groove that has no role other than to restrict rotor double frequency vibration. A form of the cutout groove 24 is not limited to the form shown in FIG. 6 and FIG. 7, as will be shown hereafter.

Next, using FIG. 9 to FIG. 12, forms according to other working examples of the cutout groove 24 of the rotor stepped portion 20 of the bipolar rotor 1 in the first embodiment will be described.

Figure 9:
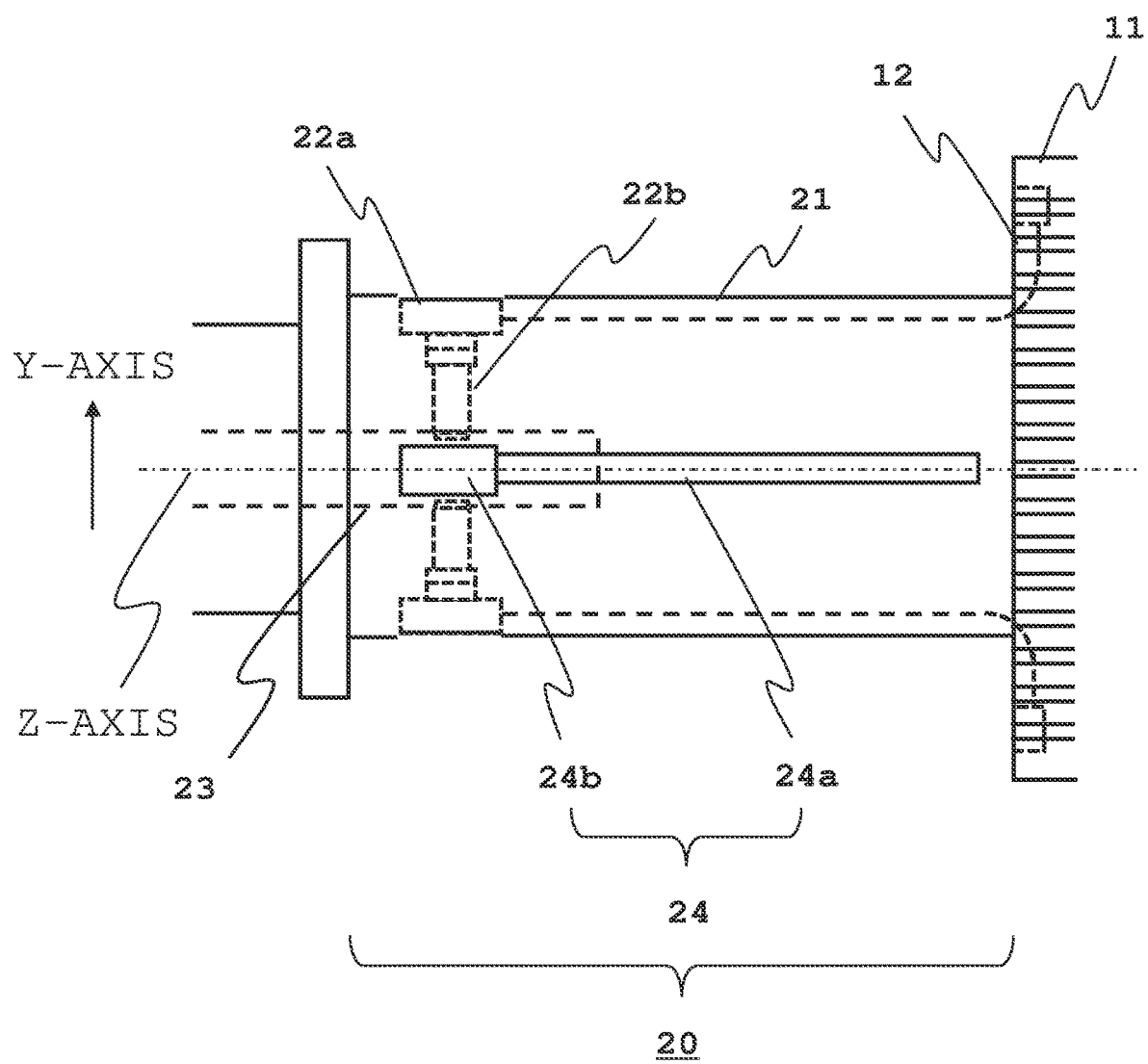
FIG. 9 is a front perspective view showing a second working example of the rotor stepped portion of the first embodiment.

FIG. 9 is a drawing showing a second working example of a cutout groove. In the first working example, one set of cutout grooves 24 of the rotor stepped portion 20 have the same sectional form with respect to the Z-axis direction, while in the second working example, as is clear from the drawing, the cutout groove 24 formed of two cutout grooves 24a and 24b, whose sectional forms and lengths with respect to the Z-axis direction differ, is provided.

Figure 10:
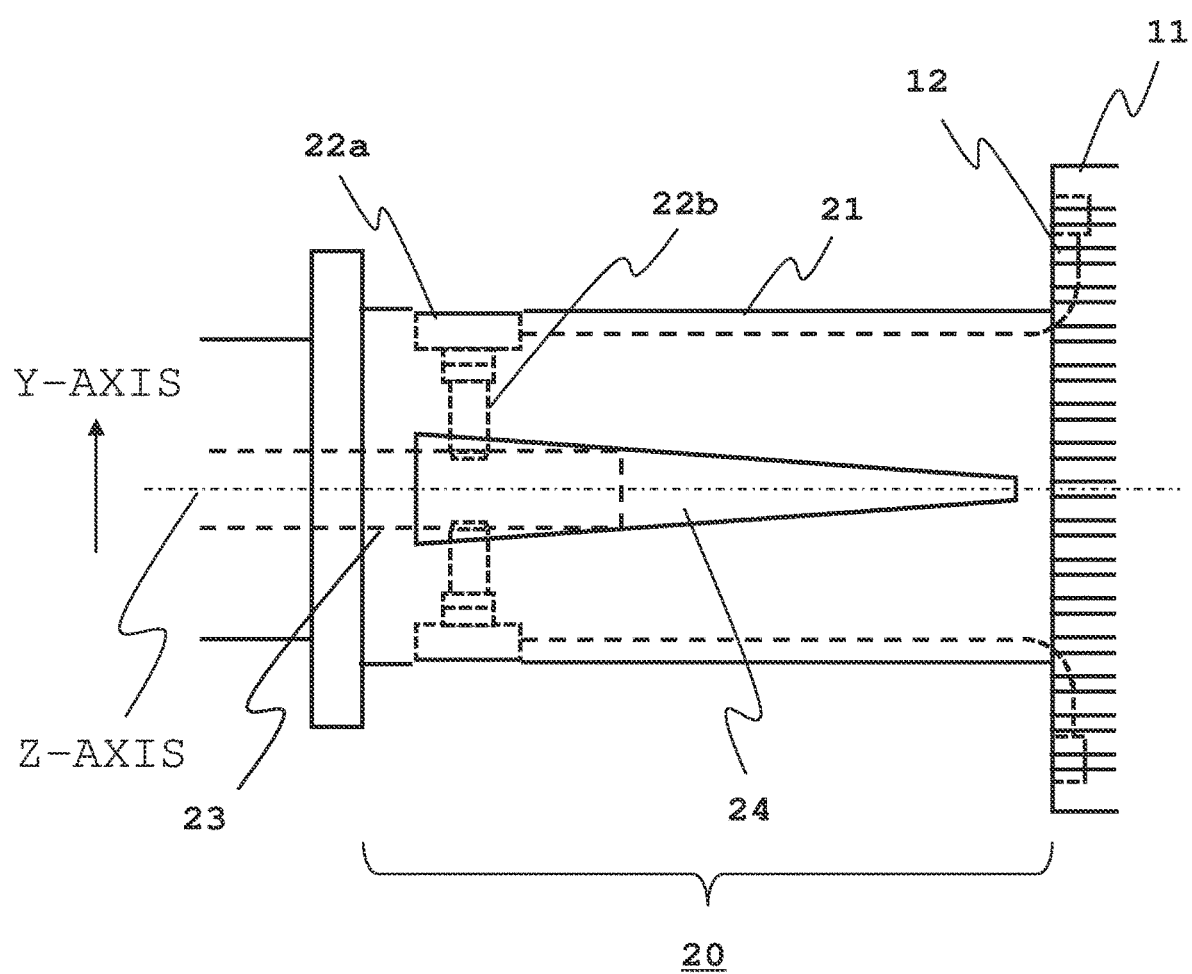
FIG. 10 is a front perspective view showing a third working example of the rotor stepped portion of the first embodiment.

FIG. 10 is a drawing showing a third working example of a cutout groove. One set of cutout grooves 24 of the rotor stepped portion 20 are such that a sectional form is tapered with respect to the Z-axis direction. As there is no restriction on a length of the cutout groove 24 in the Z-axis direction, the cutout groove 24 may, for example, be provided over the whole length of the rotor stepped portion 20, or may be provided partially with respect to the Z-axis direction.

Figure 11:
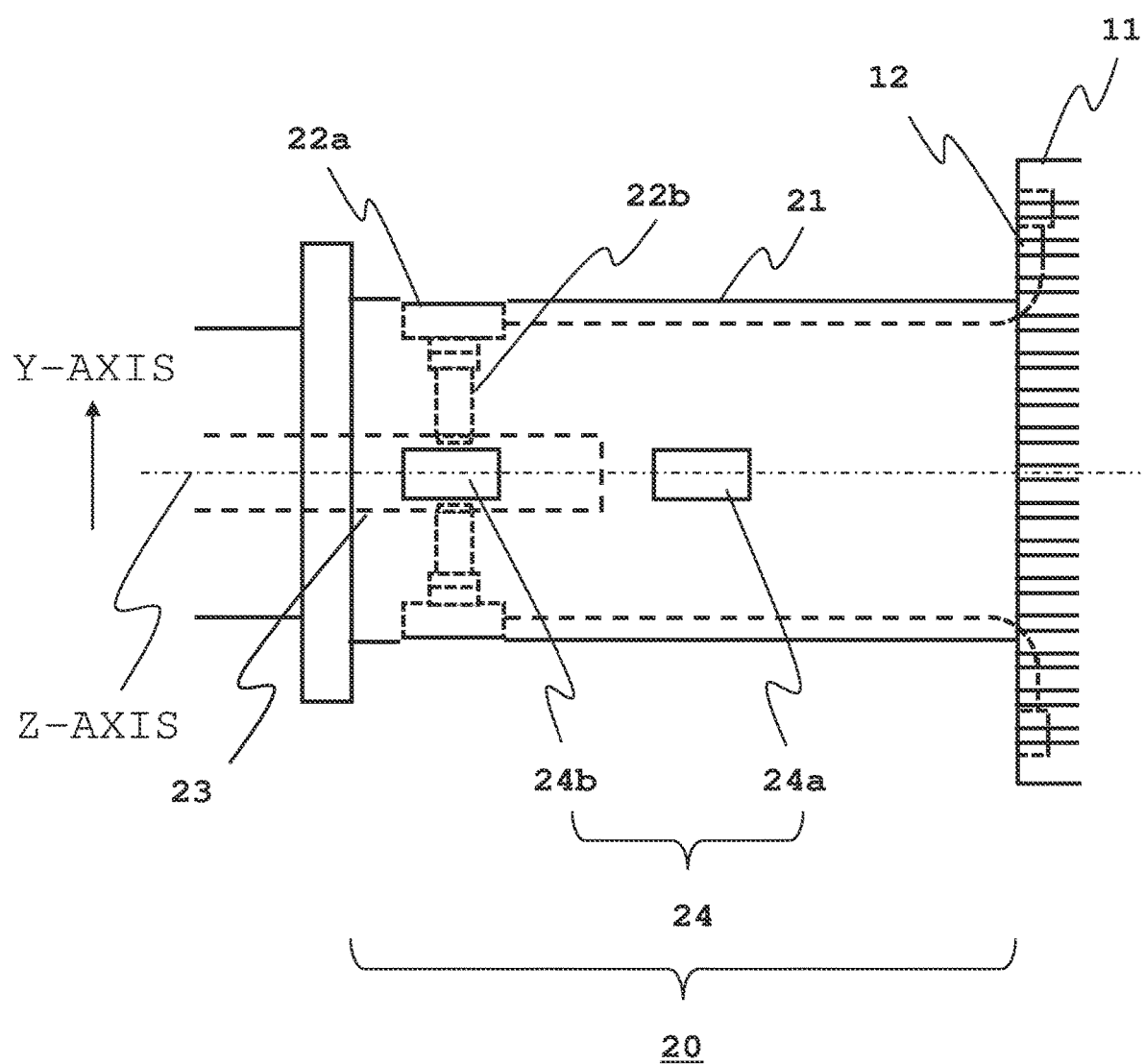
FIG. 11 is a front perspective view showing a fourth working example of the rotor stepped portion of the first embodiment.

FIG. 11 is a drawing showing a fourth working example. The cutout groove 24 is such that a multiple of cutout grooves 24a and 24b are provided in differing positions with respect to the Z-axis direction.

Figure 12:
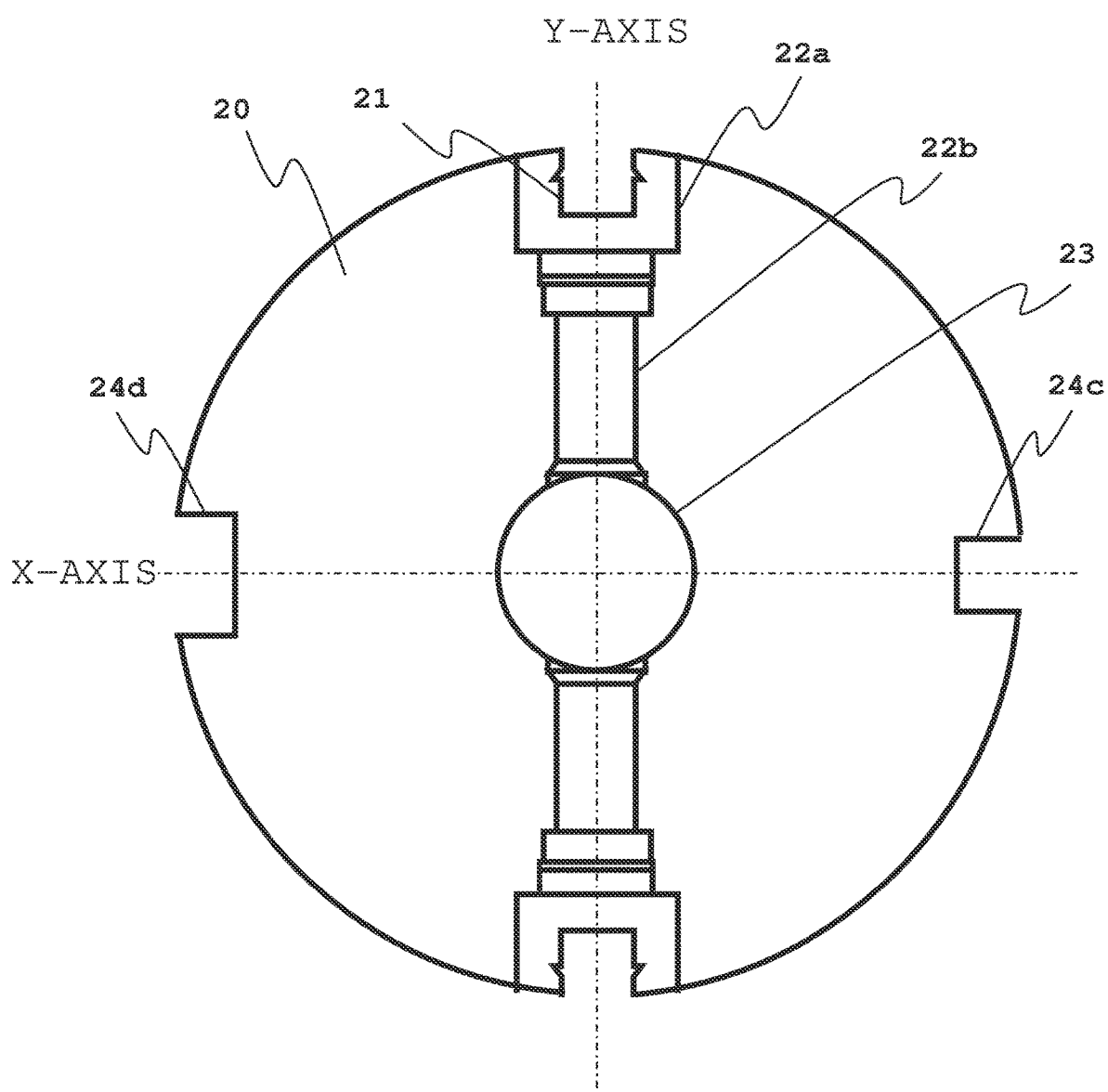
FIG. 12 is a sectional view of the B-B portion of FIG. 6 showing a fifth working example of the rotor stepped portion of the first embodiment.

The sectional view in FIG. 7 of the B-B portion of FIG. 6, which shows the first working example, is such that an advantage of restricting double frequency vibration is demonstrated to the greatest extent by providing the cutout grooves 24 having symmetrical forms with respect to the Y-axis, but as shown in a sectional view of the B-B portion of FIG. 6 in a fifth working example of FIG. 12, cutout groove 24c and 24d, whose cross-sections are of asymmetrical forms with respect to the Y-axis, may also be provided. Also, a configuration may be such that the cutout groove 24 is provided on only one side with respect to the Y-axis.

Herein, the flexural rigidity asymmetry ratio of the rotor stepped portion 20 is defined as EIsr % (EIsr=(EIsrY/EIsrX−1)×100), but sectional forms of the rotor stepped portion 20 differ in the Z-axis direction, as shown in, for example, FIG. 6. The asymmetry ratio EIsr % defined in the present embodiment indicates an asymmetry ratio of an equivalent flexural rigidity over a whole axial direction length of the rotor stepped portion 20, rather than indicating an asymmetry ratio of a certain cross-section of the rotor stepped portion 20.

Figure 13:
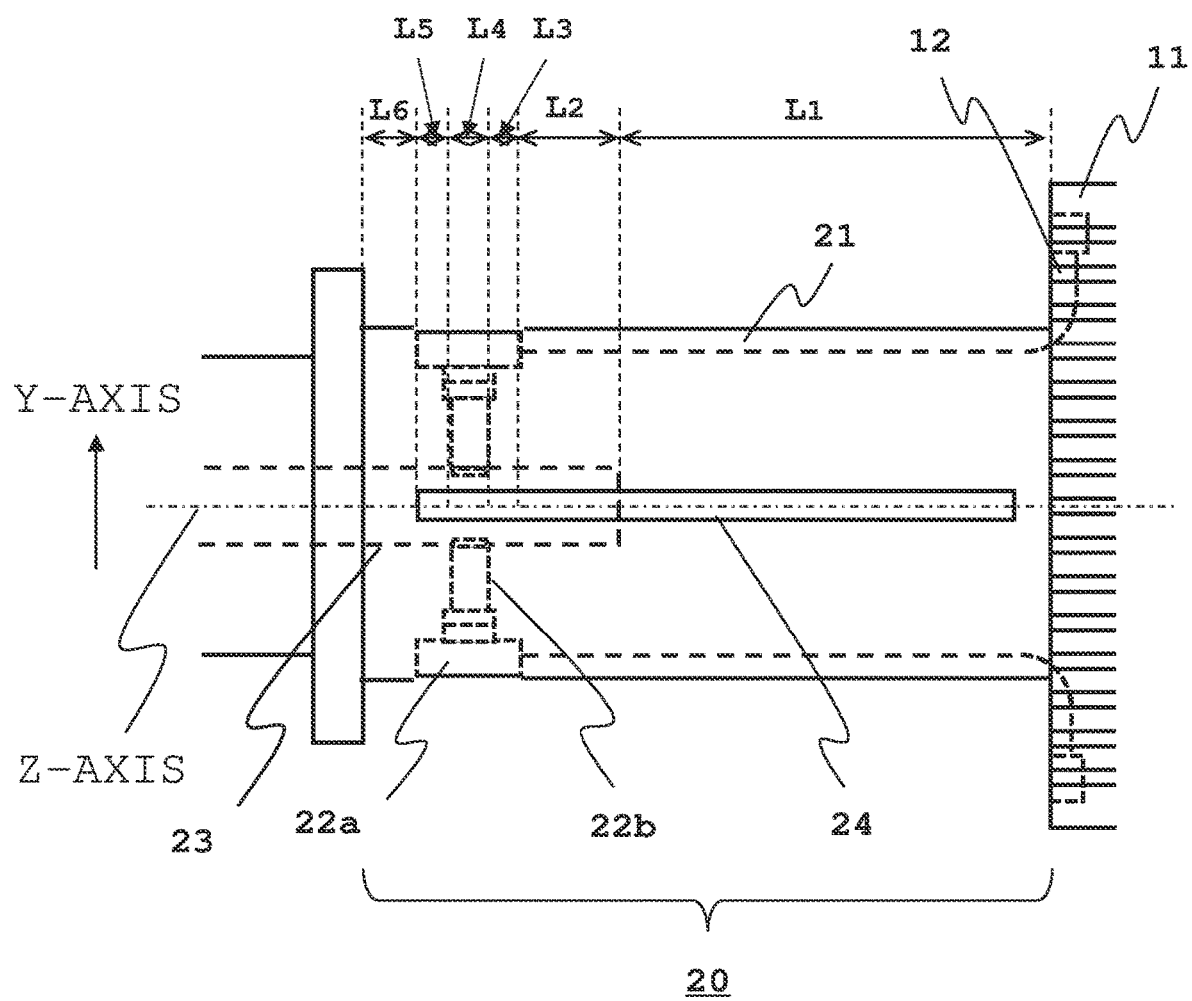
FIG. 13 is a drawing showing an example of division for calculating an asymmetry ratio of an equivalent flexural rigidity over a whole Z-axis direction length of the rotor stepped portion in the first working example of FIG. 6.

Also, FIG. 13 is a drawing showing an example of division for calculating an asymmetry ratio of an equivalent flexural rigidity over the whole Z-axis direction length of the rotor stepped portion (20) in the first working example of FIG. 6. The flexural rigidity asymmetry ratio EIsr % of the rotor stepped portion 20 in FIG. 6 can be calculated by dividing into n portions, as shown in FIG. 13, and the flexural rigidity asymmetry ratio EIsr % of the rotor stepped portion 20 in this case can be indicated by Expression 3 shown below. EIsrn=(EIsrYn/EIsrXn−1)×100, indicating the flexural rigidity asymmetry ratio of each portion of a Z-axis direction length Ln.

[Expression 3]

$$\frac{(EIsr_1 \times L_1) + \cdots + (EIsr_6 \times L_6)}{L_1 + \cdots + L_6} \times 100 \quad (3)$$

An example wherein there are six kinds (n=6) of sectional form of the rotor stepped portion 20 in the Z-axis direction is shown in FIG. 13, but it is sufficient that the number of divisions is changed in accordance with the forms of the rotor coil lead groove 21, the radial lead grooves 22a and 22b, and the cutout groove 24.

In this way, according to a rotating electric machine bipolar rotor according to the first embodiment, flexural rigidity asymmetry of a rotor main portion is adjusted using a cross slot provided in a rotor core, and flexural rigidity asymmetry of a rotor stepped portion is adjusted using a cutout groove provided in the rotor stepped portion, whereby optimization can be achieved by combining the flexural rigidity asymmetry of the rotor main portion and the flexural rigidity asymmetry of the rotor stepped portion, because of which an excitation force existing in a position of a vibration mode antinode in each flexural vibration mode of double frequency vibration can be reduced, meaning that there is an advantage in that vibration in each double frequency vibration flexural vibration mode can be restricted over a whole region of driving rotational speed.

Second Embodiment

Figure 14:
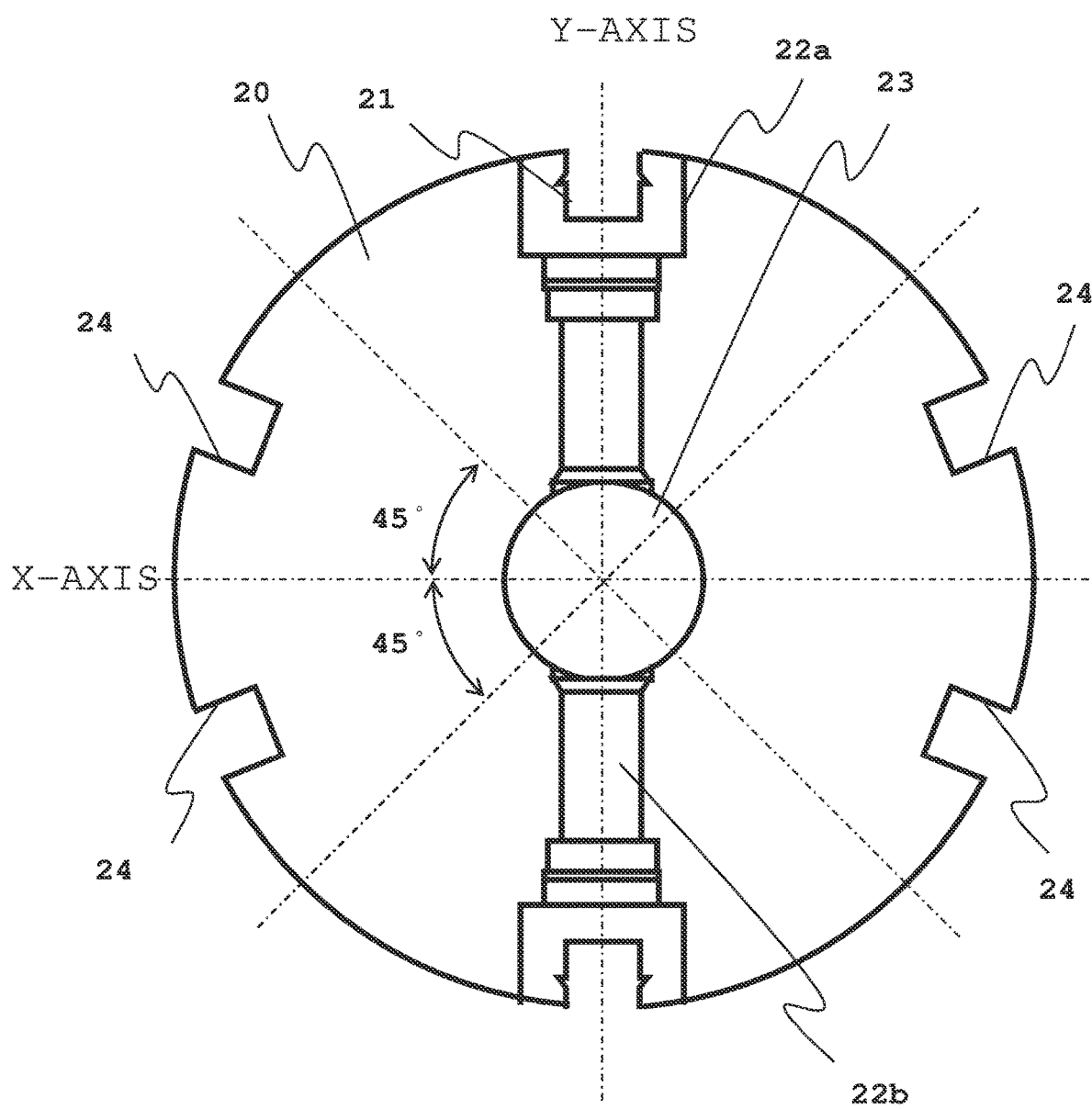
FIG. 14 is a sectional view of the B-B portion of FIG. 6 showing a working example of the rotor stepped portion of the second embodiment.

FIG. 14 is a drawing showing the rotor stepped portion 20 on the excitation device side of the rotating electric machine bipolar rotor 1 according to a second embodiment, and is a sectional view of the B-B portion of the rotor stepped portion 20 of FIG. 6. A difference from the first embodiment is that in the second embodiment, the cutout groove 24 is provided in four places in positions on the outer diameter of the rotor stepped portion 20 in an angular range of 0 to 45 degrees in the Y-axis direction, with the X-axis as a center. A description of configurations the same as in the first embodiment will be omitted.

Next, the cutout groove 24 in the rotor stepped portion 20 of the rotating electric machine bipolar rotor 1 according to the second embodiment will be described. Owing to the four cutout grooves 24 being provided on a circumference in positions on the outer diameter of the rotor stepped portion 20 in an angular range of 0 to 45 degrees in the Y-axis direction, with the X-axis as the center, the flexural rigidity EIsrY around the Y-axis is caused to decrease, thereby adjusting the flexural rigidity asymmetry ratio EIsr % of the rotor stepped portion 20. This means that, compared with the first embodiment, an equivalent advantage of restricting double frequency vibration can be obtained, even in a state wherein the rotor stepped portion 20 has high torsional rigidity.

The cutout groove 24 is not limited to being provided in four places in the circumferential direction as shown in FIG. 14. Also, a form of the cutout groove 24 not being limited to the form shown in FIG. 14, a sectional form may be changed by being divided into a multiple of stages with respect to the Z-axis direction, and the sectional form with respect to the Z-axis direction may be changed to a tapered form. Furthermore, as there is no restriction either on a length of the cutout groove 24 in the Z-axis direction, the cutout groove 24 may, for example, be provided over the whole Z-axis direction length of the excitation device side rotor stepped portion 20, or may be provided partially with respect to the Z-axis direction. Furthermore, the cutout groove 24 may be provided in multiple places with respect to the Z-axis direction.

In this way, according to a bipolar rotor of a rotating electric machine according to the second embodiment, a multiple of cutout grooves are provided on a circumference in positions on an outer diameter of a rotor stepped portion in a certain angular range in a Y-axis direction, with an X-axis as a center, thereby adjusting a flexural rigidity asymmetry ratio of the rotor stepped portion, meaning that, compared with the case of the first embodiment, there is an advantage in that an advantage of restricting double frequency vibration can be obtained, even in a state wherein the rotor stepped portion has high torsional rigidity.

In the present embodiment, a description has been given of a case wherein, in order to restrict double frequency vibration of a rotating electric machine bipolar rotor, a cutout groove is provided in an excitation device side stepped portion, but a case may also be such that a cutout groove is provided in a stepped portion on an opposite side. Also, the present embodiment can also be applied to a rotor of another rotating electric machine. Furthermore, in the aforementioned working example, a cutout groove having a form that extends in an axis of rotation direction has been described, but a cutout groove may also have a form that extends in a circumferential direction.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

Also, identical reference signs in the drawings indicate identical or corresponding portions.

REFERENCE SIGNS LIST

1: bipolar rotor
10: rotor main portion
11: rotor core
12: rotor slot
13: rotor coil
14: rotor wedge
15: cross slot
17: bearing
20: rotor stepped portion
21: rotor coil lead groove
22a, 22b: radial lead groove
23: axial lead groove
24, 24a, 24b, 24c, 24d: cutout groove

The invention claimed is:

1. A rotor of a rotating electric machine, wherein at least one cutout groove is provided in a rotor stepped portion, in an axis of rotation direction of the rotor stepped portion, in such a way that a flexural rigidity around an in-polar axis is adjusted, and a flexural rigidity around an interpolar axis and the flexural rigidity around the in-polar axis have asymmetry.

2. The rotor of the rotating electric machine according to claim 1, wherein at least one set of a multiple of the cutout groove whose sectional forms are identical is provided in outer diameter positions on the interpolar axis of the rotor stepped portion, in one portion or over an overall length of the rotor stepped portion with respect to the axis of rotation direction.

3. The rotor of the rotating electric machine according to claim 1, wherein at least one set of a multiple of the cutout groove whose sectional forms differ is provided in outer diameter positions on the interpolar axis of the rotor stepped portion, in one portion or over an overall length of the rotor stepped portion with respect to the axis of rotation direction.

4. The rotor of the rotating electric machine according to claim 1, wherein at least one cutout groove whose sectional form is tapered is provided in an outer diameter position on the interpolar axis of the rotor stepped portion, in one portion or over an overall length of the rotor stepped portion with respect to the axis of rotation direction.

5. The rotor of the rotating electric machine according to claim 1, wherein at least one set of a multiple of the cutout groove whose sectional forms are identical is provided in an angular range of 0 to 45 degrees in the in-polar axis direction, with the interpolar axis as a center, in one portion or over an overall length of the rotor stepped portion with respect to the axis of rotation direction.

6. The rotor the rotating electric machine according to claim 1, wherein at least one set of a multiple of the cutout groove whose sectional forms differ is provided in outer diameter positions in the rotor stepped portion, in an angular range of 0 to 45 degrees in the in-polar axis direction, with the interpolar axis as a center, in one portion or over an overall length of the rotor stepped portion with respect to the axis of rotation direction.

7. The rotor of the rotating electric machine according to claim 1, wherein at least one set of a multiple of the cutout groove whose sectional forms are tapered is provided in outer diameter positions in the rotor stepped portion, in an angular range of 0 to 45 degrees in the in-polar axis direction, with the interpolar axis as a center, in one portion or over an overall length of the rotor stepped portion with respect to the axis of rotation direction.

8. The rotor of the rotating electric machine according to claim 2, wherein double frequency vibration in a whole region of driving rotational speed is restricted by the flexural rigidity around the in-polar axis of the rotor stepped portion being adjusted using the cutout groove.

9. The rotor of the rotating electric machine according to claim 3, wherein double frequency vibration in a whole region of driving rotational speed is restricted by the flexural rigidity around the in-polar axis of the rotor stepped portion being adjusted using the cutout groove.

10. The rotor the rotating electric machine according to claim 4, wherein double frequency vibration in a whole region of driving rotational speed is restricted by the flexural rigidity around the in-polar axis of the rotor stepped portion being adjusted using the cutout groove.

11. The rotor of the rotating electric machine according to claim 5, wherein double frequency vibration in a whole region of driving rotational speed is restricted by the flexural rigidity around the in-polar axis of the rotor stepped portion being adjusted using the cutout groove.

12. The rotor of the rotating electric machine according to claim 6, wherein double frequency vibration in a whole region of driving rotational speed is restricted by the flexural rigidity around the in-polar axis of the rotor stepped portion being adjusted using the cutout groove.

13. The rotor of the rotating electric machine according to claim 7, wherein double frequency vibration in a whole region of driving rotational speed is restricted by the flexural rigidity around the in-polar axis of the rotor stepped portion being adjusted using the cutout groove.

14. The rotor of the rotating electric machine according to claim 8, wherein an asymmetry ratio of flexural rigidity around the in-polar axis with respect to flexural rigidity around the interpolar axis of a rotor main portion is −6 to −1% when there is resonance in a primary flexural vibration mode of double frequency vibration and 1 to 6% when there is resonance in a tertiary flexural vibration mode, and an asymmetry ratio of flexural rigidity around the in-polar axis with respect to flexural rigidity around the interpolar axis of the rotor stepped portion is 1 to 6%.

15. The rotor of the rotating electric machine according to claim 9, wherein an asymmetry ratio of flexural rigidity around the in-polar axis with respect to flexural rigidity around the interpolar axis of a rotor main portion is −6 to '11% when there is resonance in a primary flexural vibration mode of double frequency vibration and 1 to 6% when there is resonance in a tertiary flexural vibration mode, and an asymmetry ratio of flexural rigidity around the in-polar axis with respect to flexural rigidity around the interpolar axis of the rotor stepped portion is 1 to 6%.

16. The rotor of the rotating electric machine according to claim 10, wherein an asymmetry ratio of flexural rigidity around the in-polar axis with respect to flexural rigidity around the interpolar axis of a rotor main portion is −6 to −1% when there is resonance in a primary flexural vibration mode of double frequency vibration and 1 to 6% when there is resonance in a tertiary flexural vibration mode, and an asymmetry ratio of flexural rigidity around the in-polar axis with respect to flexural rigidity around the interpolar axis of the rotor stepped portion is 1 to 6%.

17. The rotor of the rotating electric machine according to claim 11, wherein an asymmetry ratio of flexural rigidity around the in-polar axis with respect to flexural rigidity around the interpolar axis of a rotor main portion is −6 to −1% when there is resonance in a primary flexural vibration mode of double frequency vibration and 1 to 6% when there is resonance in a tertiary flexural vibration mode, and an asymmetry ratio of flexural rigidity around the in-polar axis with respect to flexural rigidity around the interpolar axis of the rotor stepped portion is 1 to 6%.

18. The rotor of the rotating electric machine according to claim 12, wherein an asymmetry ratio of flexural rigidity around the in-polar axis with respect to flexural rigidity around the interpolar axis of a rotor main portion is −6 to −1% when there is resonance in a primary flexural vibration mode of double frequency vibration and 1 to 6% when there is resonance in a tertiary flexural vibration mode, and an asymmetry ratio of flexural rigidity around the in-polar axis with respect to flexural rigidity around the interpolar axis of the rotor stepped portion is 1 to 6%.

19. The rotor of the rotating electric machine according to claim 13, wherein an asymmetry ratio of flexural rigidity around the in-polar axis with respect to flexural rigidity around the interpolar axis of a rotor main portion is −6 to −1% when there is resonance in a primary flexural vibration mode of double frequency vibration and 1 to 6% when there is resonance in a tertiary flexural vibration mode, and an asymmetry ratio of flexural rigidity around the in-polar axis with respect to flexural rigidity around the interpolar axis of the rotor stepped portion is 1 to 6%.

20. The rotor of the rotating electric machine according to claim 14, wherein vibration in a secondary flexural vibration mode of double frequency vibration is restricted owing to the asymmetry ratio of flexural rigidity around the in-polar axis with respect to flexural rigidity around the interpolar axis of the rotor stepped portion being 1 to 6%.

21. The rotor of the rotating electric machine according to claim 15, wherein vibration in a secondary flexural vibration mode of double frequency vibration is restricted owing to the asymmetry ratio of flexural rigidity around the in-polar axis with respect to flexural rigidity around the interpolar axis of the rotor stepped portion being 1 to 6%.

22. The rotor of the rotating electric machine according to claim 16, wherein vibration in a secondary flexural vibration mode of double frequency vibration is restricted owing to the asymmetry ratio of flexural rigidity around the in-polar axis with respect to flexural rigidity around the interpolar axis of the rotor stepped portion being 1 to 6%.

23. The rotor of the rotating electric machine rotor according to claim 17, wherein vibration in a secondary flexural vibration mode of double frequency vibration is restricted owing to the asymmetry ratio of flexural rigidity around the in-polar axis with respect to flexural rigidity around the interpolar axis of the rotor stepped portion being 1 to 6%.

24. The rotor of the rotating electric machine according to claim 18, wherein vibration in a secondary flexural vibration mode of double frequency vibration is restricted owing to the asymmetry ratio of flexural rigidity around the in-polar axis with respect to flexural rigidity around the interpolar axis of the rotor stepped portion being 1 to 6%.

25. The rotor of the rotating electric machine according to claim 19, wherein vibration in a secondary flexural vibration mode of double frequency vibration is restricted owing to the asymmetry ratio of flexural rigidity around the in-polar axis with respect to flexural rigidity around the interpolar axis of the rotor stepped portion being 1 to 6%.

26. A rotating electric machine comprising the rotor according to claim 1.

\* \* \* \* \*